March 11, 1969     C. C. CHRISTIANSON     3,432,356

REGULATED FUEL CELL SYSTEM

Filed Sept. 11, 1963     Sheet 1 of 5

INVENTOR.
CLINTON C. CHRISTIANSON
BY Harold A. Levey, Jr.
ATTORNEY

March 11, 1969 C. C. CHRISTIANSON 3,432,356
REGULATED FUEL CELL SYSTEM
Filed Sept. 11, 1963

INVENTOR.
CLINTON C. CHRISTIANSON
BY
ATTORNEY

United States Patent Office 3,432,356
Patented Mar. 11, 1969

3,432,356
REGULATED FUEL CELL SYSTEM
Clinton C. Christianson, West Peabody, Mass., assignor to General Electric Company, a corporation of New York
Filed Sept. 11, 1963, Ser. No. 308,105
U.S. Cl. 136—86     13 Claims
Int. Cl. H01m 27/14

ABSTRACT OF THE DISCLOSURE

The invention is directed to a fuel cell system incorporating a regulating arrangement by which it is maintained near its optimum operating efficiency. A fluid impervious heat transfer element is mounted spaced from one electrode and cooled in a controlled manner so that the rate of moisture migration from the electrode to the element is controlled. In one form the controlling means monitors the output voltage of the system and in response to a voltage decline generates an electrical pulse. The pulse actuates a control between a first state in which the rate of moisture migration exceeds the rate of moisture production and a second state in which the rate of moisture migration lags the rate of moisture production. In another form of the system variation in the resistance of the electrolyte of the fuel cell produces a signal whose phase can be compared with a reference signal to regulate the rate of moisture removal.

---

This invention relates to electrical generating systems incorporating fuel cells. More specifically, it relates to the maintenance of preselected operating conditions in the fuel cells and is especially useful in operating fuel cells at their optimum values. The system controls the moisture content of the electrolytic member of a fuel cell by regulating the rate at which moisture generated in the electrolyte is removed therefrom. The moisture content is cyclically varied and a control signal developed from the resulting variation in an electrical characteristic of the fuel cell is used to maintain the average moisture content in its optimum range.

The invention is particularly directed to fuel cells using noncirculating electrolytes. For example, U.S. Patent No. 2,913,511 discloses a cell in which the electrolyte is an ion-exchanger membrane, a solid structure. Cells of this type are characterized by an ability to operate at room temperature and atmospheric pressure. They are also noted for a high volumetric efficiency. However, prior to the present invention, this capability has not been exploited to its fullest advantage. That is, in general, when fuel cells of the membrane type are operated to provide their maximum output power, they may suffer serious degradation of operating characteristics, leading in some cases to a complete failure. This is a result of dehydration, which occurs in some membranes because of the large amount of heat generated in them when large currents are drawn from the cells in which they are used.

More particularly, the amount of fuel consumed by the fuel cell is in direct proportion to the electric current derived therefrom. Since the heat generated in the membrane increases with the fuel consumption, there is also an increase in the temperature differential between the membrane and the two heat sinks, disposed opposite the electrodes which are secured to the two membrane surfaces, into which the heat is dissipated. This temperature drop exists across gaps adjacent the surfaces of the electrodes and between the electrodes and heat sinks, the gaps being the spaces through which the fuel and oxidant pass to reach these surfaces. In turn, the temperature drops across the gaps, or more particularly, the resulting temperature gradients therein, cause migration of moisture from the membrane through the electrodes and across the gaps.

The rate at which the moisture leaves the membrane depends on the magnitude of the temperature gradients in the gaps. When the electric current drawn from the cell becomes sufficiently great, the temperature gradients are large enough to draw moisture from the membrane at a faster rate than it is supplied by the production of water.

Under this condition, the membrane begins to dry out. This lowers the efficiency of the cell, causing an increase in the rate of heat generation. As a result, the rate of evaporation increases. If the cell is unattended, this circle of events continues until the cell ceases to operate. This is tantamount to a total failure of the cell.

Various modifications of the fuel cell have been resorted to in an effort to overcome this problem. For example, in a hydrogen-oxygen cell in which the water is produced on the oxygen side of the ion-exchange membrane, the fuel gap was decreased so that it was substantially narrower than the oxygen gap. It would be expected that a construction of this type would reduce moisture loss, since the narrowing of the hydrogen gap reduces the temperature of the membrane by decreasing the thermal impedance across the gap. Thus, the temperature gradient across this gap is relatively unchanged, as is the moisture loss on the hydrogen side of the membrane. At the same time, with a lower difference in temperature between the membrane and the heat sink on the oxygen side, the temperature gradient across the oxygen gap is reduced, thereby reducing the moisture loss on the oxygen side. However, even with this construction, the membrane dries out when appreciable power is extracted from the fuel cell.

It will be appreciated that this problem is not confined to ion-exchange membranes. Fuel cells using noncirculating liquid electrolytes also suffer from lack of control of their moisture content. In cells using electrolyte circulation systems, the water content of the electrolyte can be adjusted outside the cell, but where there is no such circulation, the problems set forth above are as pertinent as with ion-exchange membranes.

The copending application of Harrison et al. for an Improved Fuel Cell, Ser. No. 304,910, filed Aug. 27, 1963 discloses a fuel cell which largely overcomes the above problems. One of the gaps, e.g., the fuel gap, is provided with a heat transfer structure extending across it. The structure is made of high thermal conductivity material and is constructed to provide a fairly low thermal impedance across the gap. At the same time, it is provided with passageways permitting the fuel in the gap to reach the electrolyte. The thermal properties of the heat transfer structure result in the maintenance of a negligible temperature drop across the fuel gap and accordingly, there is no migration of moisture through this gap from the member containing the electrolyte (hereinafter termed "electrolytic member"). With this arrangement, both the temperature of the electrolytic member and the moisture content of the cell can be set at their desired levels.

In particular, they may be set at the levels corresponding to optimum efficiency or any other preselected operating condition for the current being drawn from the cell. Specifically, the temperature of the ion-exchange membrane is essentially equal to the temperature at the opposite surface of the gap in which the heat transfer structure is disposed. Therefore, by controlling the latter temperature, the temperature of the electrolytic member may also be regulated. The moisture condition in the cell depends entirely on the temperature gradient in the other gap, e.g., the oxygen gap, inasmuch as no moisture migrates across the gap containing the heat transfer structure. Therefore, the level at which moisture equilibrium is established can be set by adjusting the temperature at the surface of the oxygen gap opposite the electrolytic member.

The foregoing system provides greatly improved operation and reliability in fuel cells using non-recirculating electrolytes. This is due in large part to the fact that it is self-regulating. That is, if the moisture content of the cell increases or decreases from its optimum value, the resulting change in operating efficiency causes a change in the temperature of the electrolytic member. The consequent change in the temperature gradient across the gap through which the moisture migrates alters the rate of migration in such manner as to return the moisture content toward the level to which it was originally set.

However, under certain conditions it is possible for the operating conditions of the fuel cell to depart from the region in which there is effective compensation by self-regulation. In such cases, failure of the cell may again result. Moreover, self-regulation requires that the cells be set for operation with a moisture content somewhat greater than the level corresponding to optimum operation.

Accordingly, it is a principal object of the present invention to provide an improved fuel cell generating system capable of maintaining optimum or other preselected operating conditions in fuel cells.

A more specific object is to provide a system of the above type incorporating a non-recirculating electrolyte structure such as an ion-exchange membrane and maintaining the moisture content of the cell at its optimum level over a wide range of output current.

Another object of the invention is to provide a fuel cell system of the above type which is reliable.

A further object is to provide a system of the above type which is automatic and capable of unattended operation.

A still further object of the invention is to provide a system of the above type which is relatively immune to the effects of load variation on the characteristics of the fuel cell.

Yet another object is to provide a fuel cell system of the above type which is useful as a laboratory instrument in analyzing and optimizing the operation of fuel cells using noncirculating electrolytes.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which.

It will be understood that the various graphical illustrations in FIGURES 4 through 9 are qualitative. Moreover, there is not necessarily any correspondence between the scale factors used in these figures. Therefore, the graphs are not drawn for the purpose of providing quantative determinations of the various quantities represented by them.

In general, the present invention controls the moisture content of the fuel cell by cyclically varying it between levels above and below the optimum level. The changes is efficiency resulting from the variations in moisture content are ascertained by means of their effect on the output voltage or generating resistance of the fuel cell and a resulting signal is used to alter the moisture content.

It will be noted that the moisture content is a funcion of the rate at which moisture is generated and also the rate at which it is removed from the electrolytic member. As pointed out above, the latter rate can be regulated by controlling the temperature gradient across the gap through which the moisture migrates and thus, control may be effected by means of a mechanism which alters the temperature of the surface of this gap opposite the electrolytic member and its associated electrode.

In one embodiment of the invention the rate at which moisture is removed from the cell is varied discretely between two values, one being greater than the rate at which moisture is produced and the other less than this rate. Thus, one value tends to dry out the cell and the other tends to increase moisture contents thereof. Assuming, for example, that the moisture content is initially below its optimum level, the rate of moisture removal is set to the value which results in an increase of moisture content. The system then determines when the moisture level has increased through its optimum value by nothing the corresponding change in efficiency of operation. It then switches the moisture removal rate to its higher value so as to begin drying out the cell, i.e., reducing its moisture content. When the moisture has decreased below the optimum level, the switching action again takes place and this cycle of operation is repeated indefinitely. In this manner the optimum moisture level is bracketed between two levels which differ slightly therefrom and thus the actual level never departs substantially from the desired value.

A second embodiment of the invention is an analog system in which the rate of moisture removal is varied periodically and this variation is compared in phase with the resulting variation in efficiency of the fuel cell. The phase comparison provides an error signal indicative of the departure of the average moisture content, about which the periodic variations are imposed, from its optimum value. The system then adjusts the average value to the optimum level in response to the error signal.

Figure 1:
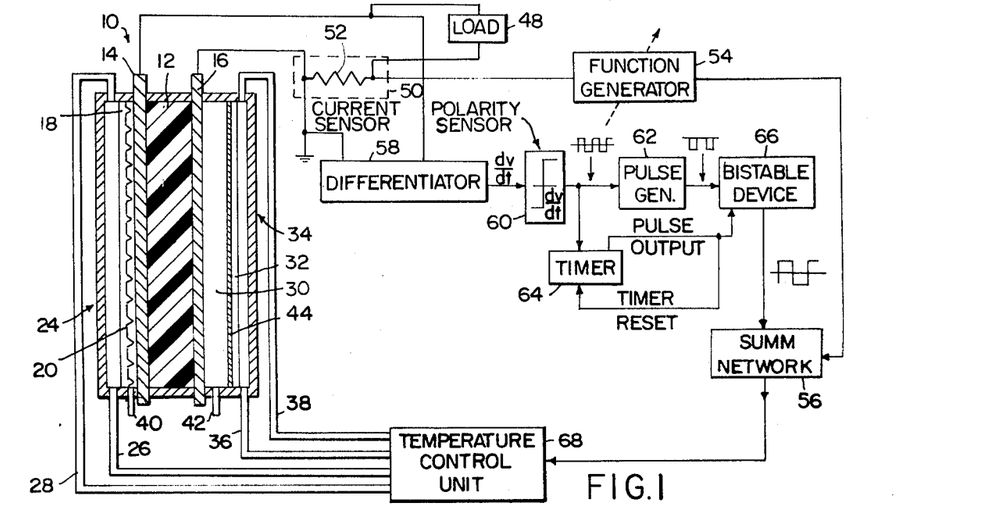
FIGURE 1 is a schematic representation, in block form, of a fuel cell control system embodying the present invention.

A fuel cell of the type to which the present invention is directed is indicated generally at 10 in FIGURE 1. It is apparent that the fuel cell 10 is a schematic representation of a fuel cell similar to that disclosed by Harrison et al. in the above-cited, copending, commonly assigned patent application. It includes an electrolytic member which for convenience will be described throughout as an acidic ion-exchange membrane 12, A pair of pervious electrodes 14 and 16, which in this example take the form of screens, are embedded in opposite surfaces of the membrane 12. A heat transfer member 18 has a grooved or channeled surface bearing against the screen 14, the opposite surface of the member 18 being impervious and thereby sealing off a fuel gap 20 bounded by the member 18 on one side and the ion-exchange membrane 12 on the other side. In one arrangement of a fuel cell of this type the member 18 is metallic and is characterized by high heat conductivity. A coolant jacket 24 is provided through which coolant is circulated by way of conduits 26 and 28.

The opposite side of the membrane 12, i.e., the side contacted by the electrode 16, borders on an oxygen gap 30. The other side of the gap 30 is sealed by a plate or heat transfer element 32, which is cooled by coolant flowing through a coolant jacket 34 by way of conduits 36 and 38. Fuel enters the fuel gap through a conduit 40 and oxygen enters oxygen gap 30 through a conduit 42. Thus it is apparent that the plate 32 functions as a fluid impervious partition sealing the oxidant gap 30 to separate the oxidant and coolant fluids while allowing heat transfer therebetween.

Assuming that the membrane 12 is of the cation-permeable type, hydrogen gas, for example, is ionized in the vicinity of the interfaces of the electrode 14 and the membrane. This results in a net migration of hydrogen ions through the membrane 12 toward the electrode 16, where the hydrogen ions combine with oxygen ions formed by the catalytic action of the electrode 16 and, in the vicinity of the interfaces of the latter electrode with the membrane 12, the two types of ions combine to form water. The ionization processes at the two electrodes bring about the deposition of electric charge on one of the electrodes and removal of charge from the other, and this provides a net electromotive force between the electrodes, which in this case also serve as the output terminals of the fuel cell.

The grooves in the surface of the heat transfer member 18, together with the interstices in the electrode 14, provide access for the fuel to the reaction sites, i.e., electrode-membrane interfaces, at which the hydrogen ions are formed. At the same time, the electrode 14 and the grooved surface of the member 18 still have a sufficiently large thermal cross-section, e.g., 25% of the actual cross sectional area, to provide a low thermal impedance between the membrane 12 and the opposite side of the fuel gap 20 sealed off by the member 18. Accordingly, the temperature is substantially uniform throughout the fuel gap and in particular, that is, there is a negligible gradient therein. Thus, there is essentially no migration of moisture into the fuel gap from the membrane 12.

On the other hand, the plate 32, which is cooled by the coolant in the jacket 34 has a somewhat lower temperature than the membrane 12 and moisture formed on the membrane migrates across the oxygen gap 30 to condense on the surface of the plate 32. A wick 44 may be affixed to this surface to provide even distribution of condensed moisture, which drops from the bottom of the wick into a suitable receptacle (not shown).

The rate at which moisture is transported across the gap 30 is a function of the difference in temperature between the ion-exchange membrane 12 and the plate 32. The temperature of the membrane 12 is a function of the heat generated within it by the chemical reactions within the cell and the temperature of the coolant within the jacket 24.

The rate at which fuel is consumed by a fuel cell is directly proportional to the electric current drawn from the cell. Since the electrical power provided by the cell is the product of voltage and current, it follows that the fuel consumption efficiency is proportional to the output voltage. This efficiency has been found to be a function of, among other factors, the amount of moisture on the ion-exchange membrane (or more generally, electrolytic member assuming the use of other noncirculating electrolyte structures).

Figure 5:
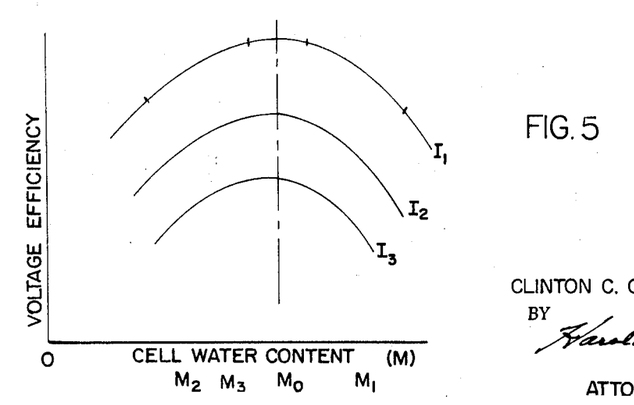
FIGURE 5 is a graphical representation of voltage as a function of cell moisture content for a number of different output currents.

FIGURE 5 shows the manner in which the efficiency of a fuel cell varies with the water content (M) for different values of current (I). It is seen that there is a moisture level $M_0$ at which the efficiency is at a maximum for the various currents drawn from the cell. For other moisture levels greater or less than $M_0$, e.g., $M_1$ and $M_2$, the efficiency is less than the value corresponding to $M_0$. Accordingly, it is desirable to stabilize operation of the cell at or close to $M_0$.

It is presently believed that when appreciable current is drawn from a fuel cell, maximum fuel consumption efficiency is obtained when the moisture content of the electrolytic member plus electrodes is equal to the water of hydration of the electrolytic member, that is, when the member is internally saturated with water and there is no excess water on the surfaces of the electrodes. The reason for this theory is that when there is excess moisture, i.e., an accumulation on the surfaces of one (or both) of the electrodes, the gaseous reagent reacting at that electrode must travel through the liquid to reach the reaction sites. The water impedes the flow of the gas and in so doing reduces the output voltage of the fuel cell.

On the other hand, a partial drying out of the electrolytic member, which reduces its moisture content below the water of hydration, impedes the passage of ions through the member. It should also be borne in mind that a partial drying out of the membrane will in some cases reduce the number of reaction sites, since moisture is required for the reactions at these places.

It will be observed that it is generally preferable to remove the moisture from the side of the membrane where it is produced, since, if it is removed from the other side, there may be a slight excess of moisture on the first side and a slight drying condition on the second side.

While the above theory concerning optimum moisture content is believed to be correct, the operation of the fuel cell and the moisture control systems described herein does not depend on this theory. However, the regulation of moisture content to optimize fuel consumption efficiency at a given power output does depend on the fact that, at any given output current, there is an optimum moisture content, whatever its value may be.

Figure 4:
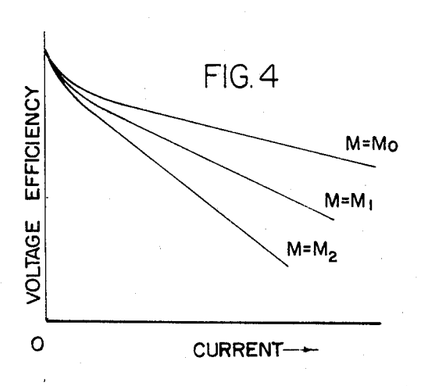
FIGURE 4 is a graphical representation of the manner in which the voltage of a fuel cell varies with current for a number of different moisture levels within the cell.

FIGURE 4 shows the manner in which the output voltage varies with current at the moisture levels $M_0$, $M_1$, and $M_2$. It is seen that the voltage and efficiency decrease as the current is increased. In other words, the rate at which heat is generated increases at a greater rate than the current. Since the moisture developed in the fuel cell is proportional to the current, the ratio of heat generation to moisture generation increases as the current increases and this results in a tendency to decrease the moisture content, i.e., dry out the electrolyte member. With reference to FIGURE 1, this problem can be alleviated somewhat by increasing the rate of heat flow from the ion-exchange membrane 12 to the coolant jacket 24, for example, by controlling the temperature of the coolant. However, this will not ensure optimization of the moisture content and it will generally cause a departure of the membrane temperature from the optimum value thereof.

Figure 6:
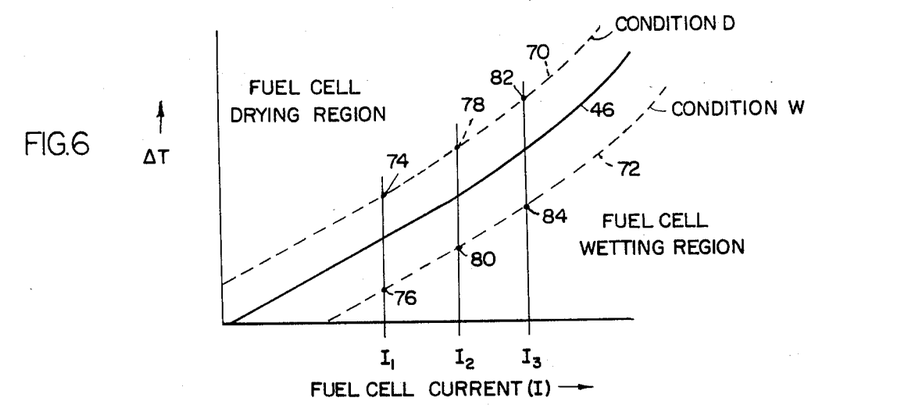
FIGURE 6 illustrates the manner in which the temperature drop across the gap through which the moisture migrates varies as a function of fuel cell current for a given moisture content in the cell.

FIGURE 6 shows, as a function of current, the temperature drop across the oxygen gap 30 (FIGURE 1) resulting in removal of moisture from the ion-exchange membrane 12 at the rate at which the moisture is generated. This function is represented by the solid line curve 46. As might be expected, the required temperature drop, i.e., the difference in temperature between the ion-exchange membrane 12 (FIGURE 1) and the cooled plate 32, increases with current, inasmuch as the rate at which moisture is generated also increases therewith. It is seen that in the region below the curve 46 the temperature difference is insufficient to remove water at the rate at which it is generated and therefore, there is an increase in the moisture content, a condition hereinafter termed the "wetting condition." Conversely, in the region above the curve 46, moisture is removed at a faster rate than it is generated and this condition is termed the "drying condition."

Returning to FIGURE 1 the output power of the fuel cell 10 is delivered to a load indicated at 48, with a current sensor 50 in series with the load. In its simplest form the sensor 50 may be merely a low resistance resistor 52. The output of the sensor is passed through a function generator 54 and applied to one input of a summing network 56.

The output voltage of the cell 10 is applied to a differentiator 58 and the polarity of the output of the differentiator is sensed by a polarity sensor 60. The sensor 60 has a uniform positive output voltage for all positive inputs thereto and a uniform negative output for negative input voltages. Accordingly, the sensor 60 provides a positive output voltage whenever the output voltage of the cell 10 increases and a negative output voltage when the output voltage of the cell 10 decreases. By virtue of its relatively quick transition from one state to the other when its input polarity changes, the polarity sensor provides an output waveform similar to that of an aperiodic square wave.

The output signal of the polarity sensor 60 is applied to a pulse generator 62 and a timer 64. The pulse generator emits a pulse whenever the output voltage of the sensor 60 changes from positive to negative, i.e., when the output voltage of the fuel cell 10 begins to decrease. The pulses from the generator 62 are applied to the complement input of a bistable device or flip-flop 66 and the flip-flop thus changes its state each time it receives one of these pulses. Illustratively, the output voltage of the device 66, which is applied to the summing network 56, alternates between positive and negative levels. Thus, the output of the summing network 56 consists of the voltage from the function generator 54 increased or decreased, as the case may be, by the voltage from the flip-flop 66.

The output of the scanning network 56 operates a temperature control unit 68. The temperature control unit in turn controls the temperature of the plate 32 across the oxygen gap 30 from the membrane 12 by regulating the rate of flow of coolant through the coolant jacket 34. A simple, electromagnetically-controlled servo valve in the line 36 or 38 may be used for this purpose.

The operation of the circuit of FIGURE 1 will now be described with reference to FIGURES 5 and 6. The function generator 54 provides an output signal which varies with the fuel cell output current in substantially the same manner as the curve 46 of FIGURE 6. More accurately, its output signal causes the temperature control unit 68 to make the difference in temperature between the membrane 12 and plate 32 vary with fuel cell current according to the function represented by the curve 46. The vertical distances between the curve 46 and the dash line curves 70 and 72 represent the output signal of the flip-flop 66. In one state of the flip-flop, this signal is added to the output of the function generator 54 by the summing network 56, resulting in a temperature difference $\Delta T$, along the curve 70. In the other state of the flip-flop, its signal is subtracted from that of the generator 54 so as to provide a voltage corresponding to the curve 72.

Assume that initially the moisture content of the fuel cell 10 is at $M_1$, on the wet side of $M_0$ as seen in FIGURE 5, and that the condition of the flip-flop 66 is such that $\Delta T$ lies on the curve 70 (FIGURE 6), for example at the point 74 corresponding to the current $I_1$. The temperature difference $\Delta T$ is greater than the value required for moisture equilibrium and thus, as indicated in FIGURE 6, the fuel cells begin to dry out, i.e., the moisture content decreases. FIGURE 5 shows that initially the output voltage of the cell increases. Thus, the output of the differentiator 58 (FIGURE 1) is positive as is the output of the polarity sensor 60.

When the water content decreases to the optimum value $M_0$, however, the voltage begins to decrease and the output of the differentiator 58 goes negative as does the output of the polarity sensor 60. The shift from the positive to negative output of the sensor 60 causes the pulse generator 62 to emit a pulse which changes the state of the flip-flop 66. The resulting change in the output of the summing network 56 shifts the temperature difference across the oxygen gap 30 to the point 76 on the curve 72. This decrease in $\Delta T$ drops the removal rate of fuel cell moisture below the rate at which it is generated and thus, the moisture content increases.

With the various lags in the system, assume that by the time the moisture content begins to increase it has decreased to the value $M_3$ in FIGURE 5. As it begins to increase, the fuel cell output voltage also increases and the output of the differentiator 58 is therefore positive. The output of the polarity sensor 60 switches from negative to positive, but this does not trigger the pulse generator 62, inasmuch as the generator 62 responds only to changes from positive to negative in the output of the sensor.

Again, when the moisture content passes through $M_0$, moving to the right in FIGURE 5, the output signal of the polarity sensor 60 switches from positive to negative, resulting in a pulse from the generator 62 and a reversal of the state of the flip-flop 66. This returns the temperature difference $\Delta T$ to the point 74 of FIGURE 6, following which the above cycle is repeated.

Thus, the water content of the fuel cell alternates between the levels $M_3$ and $M_1$ (FIGURE 5), which may be closely spaced from the optimum value $M_0$.

Figure 7:
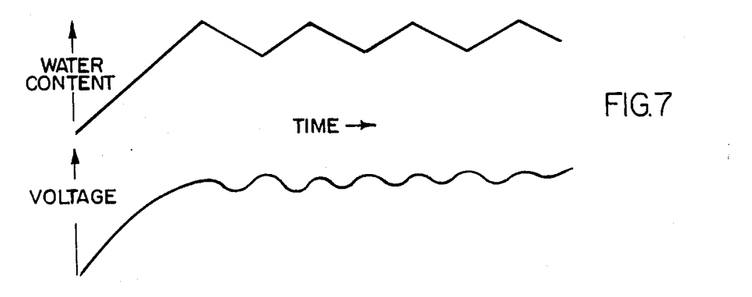
FIGURE 7 illustrates the variations of moisture content and fuel cell voltage as a function of time when the system of FIGURE 1 is used.

FIGURE 7 shows the manner in which the water content and output voltage of the fuel cell 10 may be expected to vary with operation in the above manner.

With further reference to FIGURE 1, the timer 64 operates only when the output of the polarity sensor 60 is negative. After a predetermined duration of the negative signal, the timer emits a pulse which reverses the state of the flip-flop 66. The reason for incorporating the timer in the circuit will be understood from the following example.

Assume that when the system is initially turned on, the cell water content is less than $M_0$ (FIGURE 5) and that the condition of the flip-flop 66 is such that $\Delta T$ is on the curve 70, causing the cell to dry out. With these initial conditions, there may not be a positive-to-negative transition in the polarity of the output of the sensor 60, i.e., the polarity may initially be negative, and therefore, there may be no pulse from the generator 62 to switch the state of the flip-flop. Accordingly, the circuit will have lost control of the fuel cell, which will then continue to dry out.

However, after the predetermined length of time during which the output of the sensor 60 is negative the timer emits a pulse reversing the state of the flip-flop 66, thereby causing the water content of the fuel cell 10 to increase and initiating the cyclic operation described above.

When the output current of the fuel cell increases to $I_2$ or $I_3$ (FIGURE 6) the function generator 54 increases the value of $\Delta T$ about which the alternations due to the flip-flop 66 takes place, so that operation is between points 78 and 80, or 82 and 84. In other words, the circuit of FIGURE 1 shifts the operating point along the curves 46, 70 and 72 to accommodate changes in output current.

Figure 3:
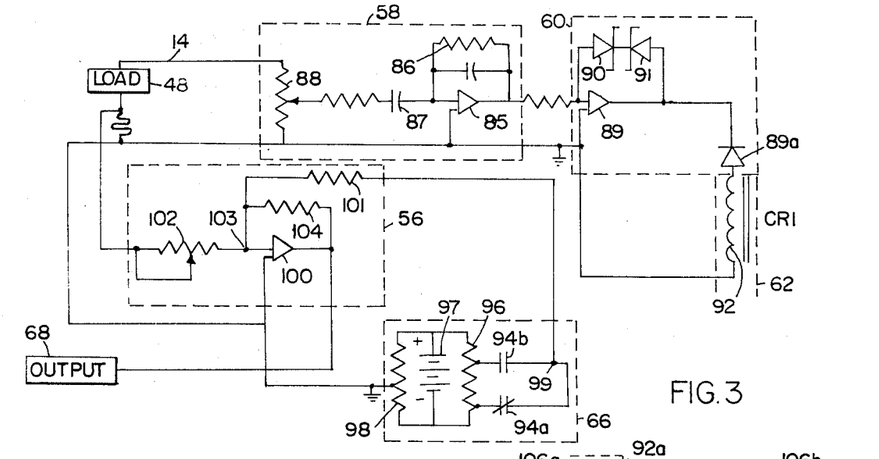
FIGURE 3 is a detailed schematic representation of one form of the system of FIGURE 1.

FIGURE 3 is a detailed schematic representation of a circuit fitting the system of FIGURE 1. The differentiator 58 includes an operational amplifier 85 with a feedback resistor 86 and an input capacitor 87 combining to provide differentiation in a well-known manner. The input level is controlled by means of a potentiometer 88.

The polarity sensor 60 includes a high-gain amplifier 89 with a feedback loop comprising a pair of Zener diodes 90 and 91 connected "back-to-back." At very low input levels the full gain of the amplifier 89 is utilized, inasmuch as the feedback path is blocked by one of the diodes 90 and 91 regardless of the polarity of the output voltage of the amplifier. However, with an appreciable signal from the differentiator 58, the output voltage of the amplifier 89 exceeds the breakdown voltage of the reversely polarized Zener diode, and a large amount of negative feedback is applied to the input of the amplifier. This essentially prevents the output voltage of the amplifier 89 from exceeding the breakdown potential of the diodes 90 and 91. The signal therefore has essentially the aperiodic square waveform described above with reference to FIGURE 1.

A diode 89a permits passage of only negative output signals from the amplifier 89.

With further reference to FIGURE 3, it will be noted that the differentiator 58 operates as an inverter. That is, the polarity of its output signal is opposite to the sign of the rate-of-change of the voltage appearing between the terminals 14 and 16 of the fuel cell. However, the amplifier 89 is also an inverter and thus the polarity of its output signal corresponds to the sign of the time derivative of the fuel cell voltage. That is, it reflects an increasing or decreasing fuel cell voltage.

The pulse generator 62 includes a relay 92 having normally open contacts 92a which, when closed, pass a current impulse from a power supply 93 through an impulse latching relay 94 by way of a capacitor 95. The relay 94 is part of the flip-flop 66 of FIGURE 1. It may take the form of a conventional two-position rotary stepping device having normally closed and normally open contacts 94a and 94b, respectively. Each time the relay 94 receives a current impulse through the capacitor 95, one of the contacts closes and the other opens. These contacts are connected to taps on a resistor 96, which is connected across a battery 97. Across the battery is a second resistor 98 having a grounded center tap.

The contacts 94a and 94b are also connected to the output terminal 99 of the flip-flop 66, and it will be seen that when the contact 94a is closed and the contact 94b is open, a negative potential appears at the terminal 99, with the reverse condition, there is a positive potential at this terminal.

Still referring to FIGURE 3, the output terminal 99 of the flip-flop 66 is connected to the summing network 56, which is seen to include an amplifier 100 and summing resistors 101 and 102. The resistor 102 also serves as the function generator 54 of FIGURE 1, and in this connection it is noted that the function generated by this resistor is a linear one. That is, it provides at the summing point 103 a voltage contribution which is linearly related to the current from the fuel cell 10. Under most conditions this is a sufficient approximation of the function described by the curve 46 of FIGURE 6.

The summing network 56 also includes a feedback resistor 104 and thus, in a well-known manner, the network operates to provide at the output of the amplifier 100 a signal which is the sum of the signals supplied to the resistors 101 and 102 from the terminal 99 and the current sensing resistor 52.

The circuit of FIGURE 3 operates in the manner described above in respect to FIGURE 1. When the output voltage of the fuel cell begins to decrease, a negative output from the amplifier 89 is passed by the diode 89a to energize the relay 92. As noted above, the contact 92a then closes to pass a current impulse through the latching relay 94. This reverses the state of the flip-flop 66 and, in particular, reverses the polarity of the voltage at the terminal 99.

The output voltage of the fuel cell then begins to increase and this results in a shift of the output voltage of the amplifier 89 to a positive level. The relay 92 is thus de-energized, opening the contacts 92a and closing contacts 92b to discharge the capacitor 95 through a resistor 105. The capacitor 95 is thus conditioned to pass the next impulse from the power supply 93 when the output voltage of the fuel cell passes its maximum value and begins to decrease.

The timer 64 includes a resistor 106 in series with a relay coil 107, with a capacitor 108 in parallel with the coil. When the output voltage of the fuel cell begins to decrease and the contacts 92a are closed, a charging current for the capacitor 108 passes through the resistor 106. If the output voltage of the fuel cell does not begin to increase once again within the allowed range of time, the charging of the capacitor 108 continues until the voltage across it is sufficient to energize the coil 107. Normally closed contacts 106a then open, disconnecting the power supply 93. At the same time, normally open contacts 106b close to discharge the capacitor 95. By virtue of the blocking action of a diode 109, the capacitor 108 discharges entirely through the relay coil 107, and when its voltage decreases below the point required to maintain energization of the coil, the contacts 106b open and the contacts 106a close. This results in the application of another impulse to the latching relay 94, with a consequent reversal of the polarity at the terminal 99.

It will be appreciated that the circuit of FIGURE 3 is merely illustrative and that other embodiments of the devices specifically shown therein may be used. For example, the sensor 60 may be a Schmitt trigger and the pulse generator 62 may consist of a differentiator connected to the output of the Schmitt trigger, with a diode conneced to the output of the pulse generator to prevent the emissive of positive going pulses therefrom. The flip-flop 66 may be an electronic flip-flop and the timer 64 may then take the form of an R-C charging circuit, as in the timer 64 of FIGURE 3, with a discharge device such as a neon tube or equivalent semi-conductor component connected across the capacitor. The discharge device conducts, to discharge the capacitor and provide an output pulse, when the capacitor voltage reaches a predetermined level.

The temperature control unit 68 also includes a valve which controls the flow of coolant through the jacket 24. In this manner, it regulates the temperature of the ion-exchange membrane 12, which rejects most of its heat in the direction of the jacket 24. The rate at which heat is generated in the membrane 12 is a function of the output current of the fuel cell 10. Accordingly, the output of the function generator 54, as modified by the control unit 68, may be used to control the flow of coolant through the jacket 24 in such manner as to maintain the temperature of the membrane 12 at its optimum level. Alternatively, a simple servo control, making use of a temperature sensor embedded in the heat transfer member 18 (which is at the temperature of the membrane 12), may be used by the control unit 68 in regulating the temperature of the membrane.

While the circuit of FIGURE 1 is fully operable in most situations, there are some conditions of operation for which it may not stabilize the fuel cell 10 at the desired operating point. For example, the above discussion assumed that the function generator 54 provides a temperature difference ΔT fairly approximating the curve 46 of FIGURE 6. Should the cell 10 depart from its expected characteristics, the curve 46 might lie outside the region encompassed by the curves 70 and 72. In such cases, a drying or wetting condition would prevail regardless of the state of the flip-flop 66.

Moreover, with certain types of electrical loads, the voltage measured at the electrodes 14 and 16 may not be truly representative of efficiency of operation. Thus, a system basing its control on this voltage might well stabilize operation at a point other than the desired operating point.

Figure 2:
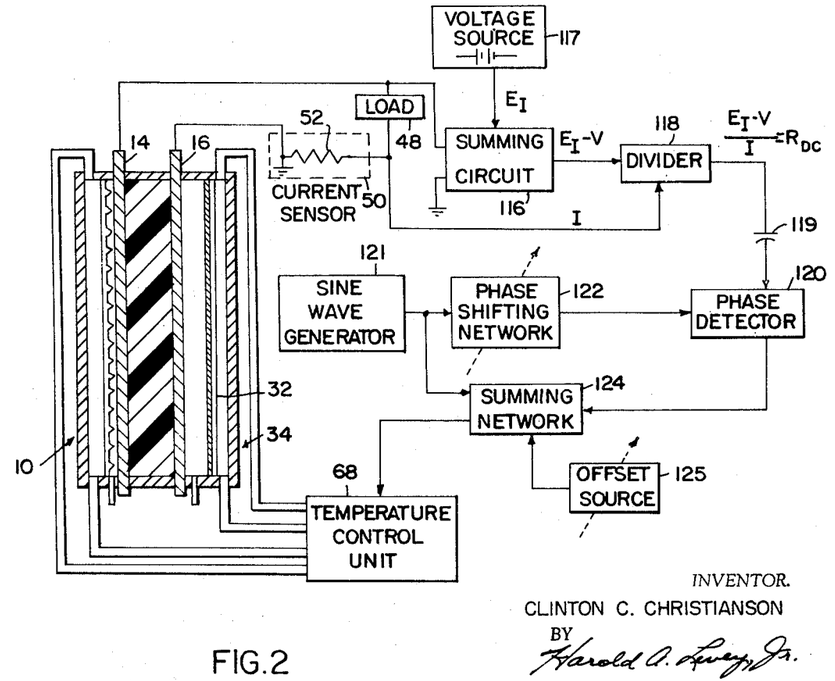
FIGURE 2 is a schematic representation of a second embodiment of the invention.
Figure 8:
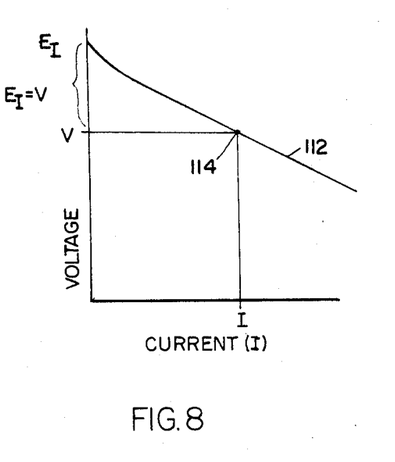
FIGURE 8 is a plot of fuel cell voltage against current for a given moisture content, illustrating the definition of generating resistance, $R_{DC}$.

The circuit of FIGURE 2 is effective in these situations, and for an understanding of the manner in which the circuit operates reference is first made to FIGURE 8. A characteristic of the voltage-versus-current curve 112 therein is its slope. This slope, which may be termed the generating resistance, $R_{DC}$, varies with the current, but it may be reasonably approximated by $$R_{DC} = \frac{E_I - V}{I}$$

where $E_I$ is the fuel cell output voltage at zero current; and V and I are the voltage and current, respectively, at the operating point, e.g., the point 114 of FIGURE 8.

In FIGURE 4, it is seen that the curve corresponding to the optimum moisture content has smallest slope, i.e., the smallest value of $R_{DC}$, and that for all other values of water content $R_{DC}$ is greater.

Figure 9:
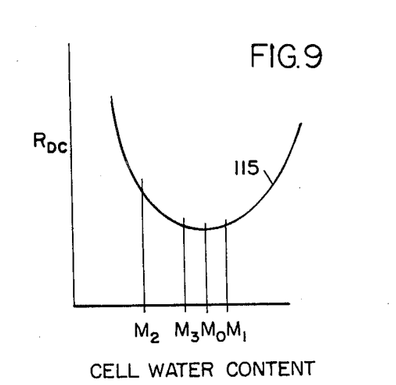
FIGURE 9 is a plot of $R_{DC}$ against moisture content of a fuel cell.

This relationship between $R_{DC}$ and the water content of the fuel cell is displayed more clearly in FIGURE 9. The curve 115 therein indicates that $R_{DC}$ increases from a minimum value at $M_0$ when the moisture is either increased or decreased from that level. Thus, $R_{DC}$ is a measure of the operating efficiency of a fuel cell and, in particular, an indication of the departure of the water content from its optimum value. Moreover, this parameter is not as subject to load variations as the output voltage of the fuel cell.

With further reference to FIGURE 2 the output voltage V of the fuel cell 10 is applied to a summing circuit 116. The circuit 116 combines the voltage V with the voltage $E_I$, from a voltage source 117 (e.g., battery) to provide an output, $E_I - V$. The latter signal is applied to one input of a divider 118. The other input of the divider is the output of the current sensor 52, i.e., a voltage corresponding to the current I. The divider 118 may be a conventional circuit which provides at its output terminals the quotient of the two input signals thereof and in this case, the output is $$\frac{E_I - V}{I}$$

the quantity $R_{DC}$. (The constants of proportionality resulting from the operations performed by the circuits 52, 116, 117 and 118 have been omitted, inasmuch as they do not affect the basic operation of the circuit.)

The output of the divider 118 is passed through a capacitor 119 which filters out the direct-current component and the resulting A-C component is fed to a phase detector 120. The other input of the phase detector is from a sine wave generator 121 by way of a phase shifting network 122. The output of the phase detector is combined in a summing network 124 with the output of the generator 121 to provide a control signal for the temperature control unit 68.

More specifically, the output of the network 124 includes the direct-current output of the phase detector 120 and the alternating-current output of the generator 121. The alternating component in the output of the summing network 124 causes oscillation of the temperature control unit 68 in synchronism with the output of the sine wave generator 121. Specifically, it causes the coolant flow through the jacket 34 to increase and decrease slightly about the average or base flow level. Consequently, the temperature of the plate 32 undergoes a small periodic variation in synchronism with the output voltage of the generator 121.

The variation of the temperature of the plate 32 brings about a corresponding variation of the moisture content of the membrane 12. As a result, the generating resistance $R_{DC}$ of the fuel cell, as it appears at the output of the divider 118, includes a small alternating component at the frequency of the generator 121. This component, after filtering, is compared, in phase, with the output of the generator 121 in the phase detector 120. If the two inputs to the phase detector are in phase with each other, the direct-current output of the detector will have a polarity resulting in adjustment of the control unit 68 in a first direction, e.g., toward a higher temperature in the plate 32. If the two input signals of the detector 120 are 180° out of phase with each other, the output of the detector will have the opposite polarity and the temperature control unit will be energized to adjust the temperature of the plate 32 in the opposite direction, e.g., to decrease the temperature. The direct-current input of the control unit 68, which thus controls the average or base level of the moisture removal rate, continues until the alternating-current component in the $R_{DC}$ signal at the output of the divider 118 is reduced to zero. At this point, the moisture content of the ion-exchange membrane is at substantially its optimum value.

More specifically, during one half of each cycle of the output voltage of the generator 121, the temperature control unit 68 moves in a direction providing an increase in the water content of the membrane 12. During the second half cycle, the moisture content is decreased. These periodic increases and decreases stem from increases and decreases in the moisture removal rate about the average value of this rate; the average value, in turn, results from operation of the temperature control unit in response to the direct-current component appearing from time to time in the output of the summing network 124. Thus, during the first half of each cycle the water content may be shifted to the right with reference to FIGURE 9 and during the second half of the cycle it may be shifted to the left.

If the operating point of the fuel cell 10, i.e., the average value of the water content of the ion-exchange membrane 12, is at $M_1$ (FIGURE 9), this will result in an increase in the generating resistance $R_{DC}$ during the first half cycle and a decrease in the second half cycle. On the other hand, if the water content is less than the optimum value $M_0$, e.g., at $M_3$, $R_{DC}$ will decrease during the first half of each cycle and increase during the second half. Thus, the phase of the alternating-current component at the electrodes 14 and 16 of the fuel cell depends on whether the moisture content is above or below the optimum value thereof. The phase detector 120, as pointed out above, provides a direct-current output whose polarity depends on whether the phase of this alternating-current component is the same as or opposite to the phase of the output of the generator 121. Thus, the D-C polarity indicates the direction in which the temperature control unit 68 should adjust the moisture content of the ion-exchange membrane to move toward the optimum value $M_0$, and this is exactly the manner in which the control unit responds to this signal.

If the operating point is exactly at $M_0$, the alternating-current component of $R_{DC}$ will have no component at the frequency of the generator 121, although the second harmonic component will be a maximum in this case. Thus, there will be no output from the phase detector 120 and no corrective signal will be applied to the temperature control unit 68.

In this connection, it is noted that the temperature control unit 68 has slightly different constructions in the systems of FIGURES 1 and 2. In FIGURE 1, the function generator 54 has a continuous output. Therefore, the servo-valve in the control unit should have a return spring whose force counteracts the electromagnetic control force resulting from this signal.

On the other hand, the control unit 68 of FIGURE 2 receives a direct-current output only when there is an error in the temperature gradient across the oxygen gap 30. Thus the servo-valve should be an integrating device, without a return spring, which stays in the position to which it is brought by the signal from the phase detector 120, until another error signal is received from the detector.

The above discussion assumes symmetry of the $R_{DC}$—M curve 90 of FIGURE 9. If the curve is unsymmetrical, the servo system will center operation of the fuel cell at a point slightly different from the optimum moisture content. In such case, an offset source 125 may be connected to add a corrective voltage into the summing network 124. This voltage corresponds to the difference between the optimum moisture content $M_0$ of the ion-exchange membrane 12 and the point corresponding to zero output from the phase detector 120. The source 108 may, in its simplest form, be merely a battery.

In addition to its utility in a high-power operation, the moisture control system illustrated in FIGURE 2 (as well as the system of FIGURES 1 and 3) is highly useful in the laboratory study of fuel cell operation. In this application, it is advantageous to make the offset source 125 a variable device, so that the water content of the ion-exchange membrane can be set at any desirable value. For this purpose, the offset source may comprise a center-tapped battery, coupled by means of a variable voltage divider to the summing network 124.

It will be appreciated that the time required by the moisture content of the fuel cells to vary, following a change in the position of the valve in the temperature control unit 68, may be appreciable. This lag is due to several causes. In the first place, a certain amount of time is required for the change of flow through the conduits 36 and 38 to bring about a corresponding change in the temperature of the plate 32.

Secondly, once the temperature of the plate has changed, more time is required for the effect of this change to extend across the oxygen gap 30 to the membrane 12 to bring about a change in the moisture removal rate. Finally, the moisture content of the membrane 12 is a function of the time integral of the moisture removal rate. These delays have the combined effect of a low pass filter and the frequency of the generator 121 should be low enough to compensate for the effect of this filtering action. That is, it should be low enough to permit the moisture content of the membrane 12 to follow the alternating component of the output voltage of the summing network 124. The phase shifting network 122 compensates for the lag between the generator voltage and the alternating component in the output of the divider 118. It will be understood that some amplification will in general be required in the servo loop.

Figure 1A:
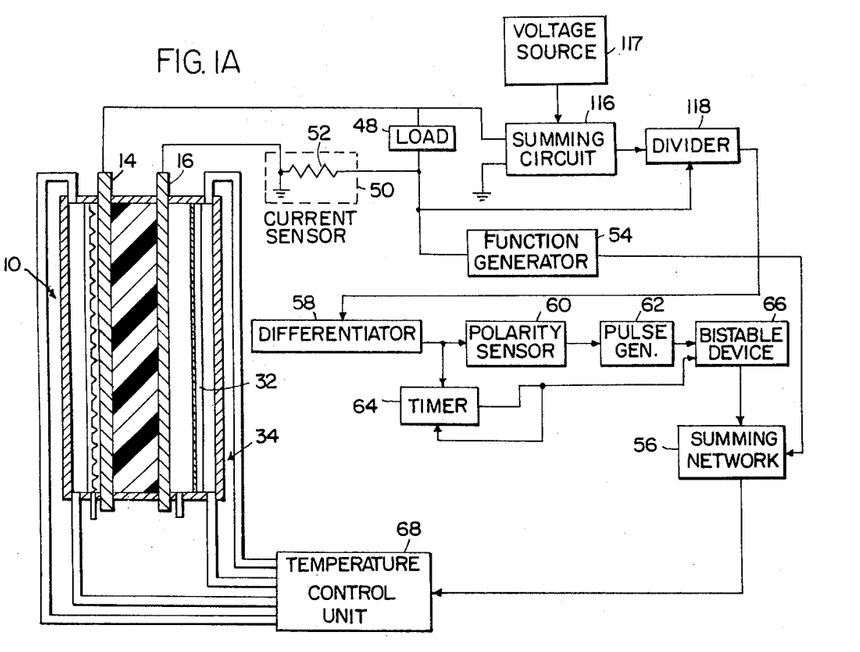
FIGURES 1A and 2A illustrate modifications of the systems of FIGURES 1 and 2.

Certain features of the systems of FIGURES 1 and 2 can be interchanged. For example, in a two-position servo of the type illustrated in FIGURE 1, the control function may be made responsive to $R_{DC}$ instead of fuel cell voltage. Specifically, as shown in FIGURE 1A, the computing section of FIGURE 2, which provides the electrical analog of $R_{DC}$ at the output of the divider 118 may be included in the circuit, with this signal. The $R_{DC}$ signal, instead of the fuel cell output voltage is then fed to the differentiator 58. Since $R_{DC}$ increases when operating efficiency decreases, the pulse generator 62 should respond to positive output signals from the polarity sensor 60 rather than negative signals.

Figure 2A:
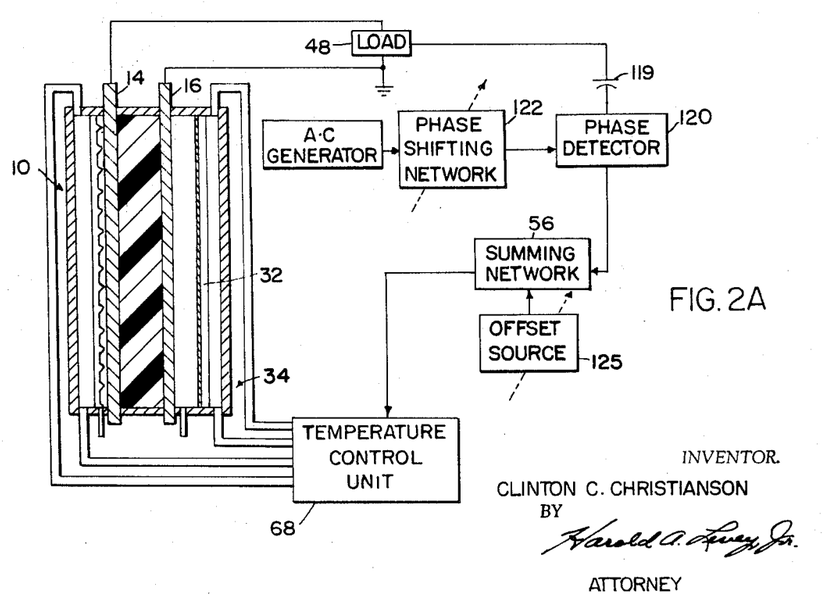

Also, the continuously operating servo system of FIGURE 2 may be made responsive to fuel cell output voltage by feeding the alternating component thereof to the phase detector 120 rather than the alternating component of $R_{DC}$ as shown. Such a circuit is shown in FIGURE 2A. In this case, the relationship of the polarity of the output of the phase detector 120 to the direction of the corrective action required of the temperature control unit 68 may be reversed with respect to the relationship inherent in FIGURE 2.

Figure 10:
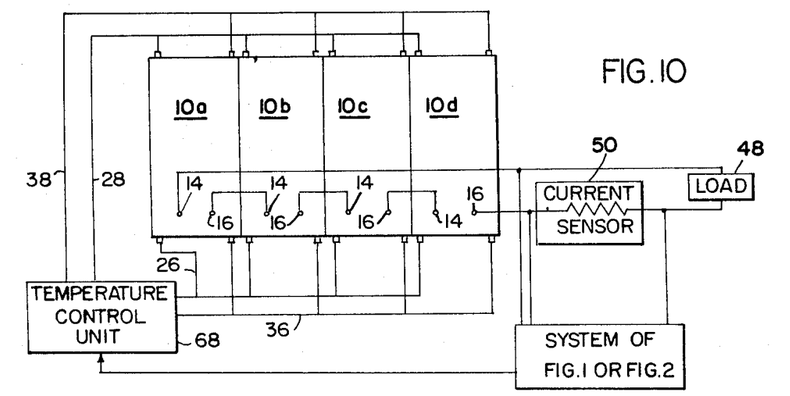
FIGURES 10 and 11 schematically illustrate the manner in which the systems of FIGURES 1, 1A, 2 and 2A may be applied to groups of interconnected fuel cells.

FIGURE 10 illustrates one way in which the systems of FIGURES 1, 1A, 2 and 2A may be used to control the characteristics of a stack of interconnected fuel cells. Cells 10a–10d are connected in series as shown to provide a higher output voltage across the load 48. The output voltage of the stack and the load current are sensed as described above and used to provide a control signal for the temperature control unit 68. The control unit, in turn, controls the flow of coolant to all the fuel cells, which are connected in a parallel arrangement in the coolant flow system.

The arrangement of FIGURE 10 assumes that the characteristics of the individual cells 10a–10d are in fairly close correspondence. Where this is not the case, and optimum efficiency from each cell is desired, individual control of the operating characteristics of the cells will be preferable. One way in which this may be accomplished is to provide for each cell a system of the type illustrated in FIGURES 1–2A.

It will be apparent that the arrangement can be simplified somewhat, if the fuel cells can be connected in series. A single current sensor and function generator can be used for all cells.

It should be noted that when there is to be individual control of parallel-connected fuel cells, a voltage sensing system cannot be used, since the same voltage exists across all the cells. However, the generating resistance, $R_{DC}$, can vary from cell to cell and therefore, this is the parameter that should be sensed by the control system.

Figure 11:
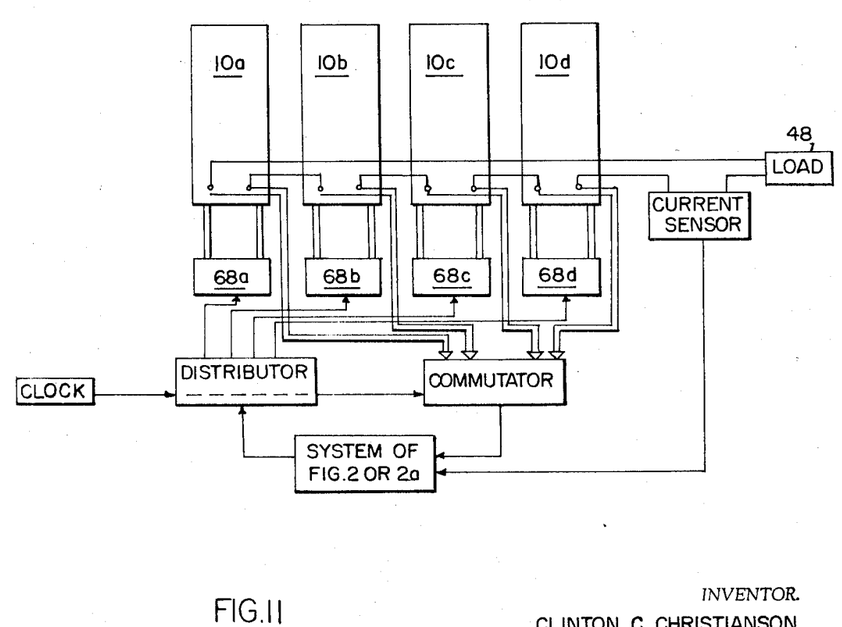

In FIGURE 11 we have illustrated an arrangement by which one control system may be used to exercise individual control over a number of fuel cells. Again the cells 10a–10d are connected in series and the current drawn by the load 48 is sensed by a current sensor 50 which, in this case, is part of a system of the type shown in FIGURE 2 or 2A. Individual temperature control units 68a–68d are connected to control the flow of coolant through the respective fuel cells. These temperature control units are sequentially connected to the system of FIGURE 2 by a distributor 110 and the system senses the output voltages of the cells in the same sequence by means of a commutator 112, which, along with the distributor 110, is stepped from position to position by pulses from a clock 114. The distributor 110 and commutator 112 stop in each position long enough for the system to sense a departure of $R_{DC}$ from its optimum value and apply a corrective signal to the temperature control unit connected into the circuit at that time.

It will be apparent that a substantial cost saving can be effected by an arrangement of the type shown in FIGURE 11, inasmuch as the computing and error-determining portions of the circuit need not be repeated for each cell. Yet, because of the fairly slow response of the cell efficiency to a change in coolant flow, little if any accuracy in the control of the cells is lost by the virtue of the fact that each cell is connected to the control system for only a small portion of the time. That is, once a corrective signal has been applied to one of the temperature control units 68a–68d there is an appreciable time interval before the resulting change in cell efficiency is great enough to be readily sensed by the control system. It is during this interval that the system is connected to operate on the other fuel cells in the stack.

While the invention has been described with specific reference to a fuel cell using an ion-exchange membrane, it is fully applicable to other electrolytes. For example, it may be used with liquid electrolytes, particularly where external means for replenishing or extracting water from the electrolyte are not utilized. In this connection, it is noted that regardless of whether a membranous or liquid electrolyte is used, the entire structure containing the electrolyte may be termed an "electrolytic member."

It is further obvious that the system of the present invention could control fuel cell performance or efficiency by controlling parameters other than temperature, as e.g., the oxidant partial pressure.

It will also be apparent that the invention may be used in cells in which the reaction product is a liquid, other than water, acting as an ionizing agent in the electrolyte. Furthermore, an oxidant other than oxygen and a fuel other than hydrogen may be used.

Moreover, while the foregoing description specifically relates to a fuel cell in which water is formed in the vicinity of the interface of the electrolyte and electrode on the oxidant side, the invention is equally applicable to cells forming water at the fuel side. In the latter case, it may be desirable to remove the reaction product from the fuel side and provide the oxidant gap with the high thermal conductance (i.e., low thermal impedance) discussed above.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

I claim:
1. A fuel cell system comprising
   first and second electrodes,
   electrolyte means for ionically communicating said electrodes,
   means for separately directing fuel and oxidant reactants to said first and second electrodes, respectively, whereby the fuel and oxidant reactants may be consumed to produce a reaction product at one of said electrodes,
   said directing means including a fluid impervious heat transfer element spaced from said one electrode to form a reactant gap therebetween,
   means for cooling said heat transfer element so as to establish a temperature gradient across said gap thereby causing migration of the reaction product from said one electrode to said heat transfer element, and
   means for regulating said cooling means in accordance with the electrical output from said first and second electrodes.

2. A fuel cell system according to claim 1 additionally including wicking means mounted in contact with said heat transfer element to evenly distribute the reaction product over the surface thereof.

3. A fuel cell system according to claim 1 in which said regulating means includes
   means for cyclically biasing said cooling means to produce rates of migration of the reaction product to the heat transfer element which alternately lag and exceed the rate at which the reaction product is formed and
   means for actuating said cyclic biasing means to stimulate a rate change in response to variations in the operating efficiency as determined from variations in the electrical output.

4. A fuel cell system according to claim 3 additionally including
   means for actuating said cyclic biasing means to stimulate a rate change after a set time interval during which no rate change has occurred.

5. A fuel cell system comprising
   first and second electrodes,
   electrolyte means for ionically communicating said electrodes,
   means for separately directing fuel and oxidant reactants to said first and second electrodes, respectively, whereby the fuel and oxidant reactants may be consumed to produce a reaction product at one of said electrodes,
   said directing means including a first fluid impervious heat transfer element spaced from said one electrode to form a reactant gap therebetween,
   said directing means including a second fluid impervious heat transfer element having a channeled face lying in thermally conductive relation with the remaining of said electrodes,
   means for circulating a coolant into contact with at least said first heat transfer element thereby causing migration of the reaction product from said one electrode to said first heat transfer element, and
   means for regulating said coolant circulating means in accordance with the electrical output from said first and second electrodes.

6. A fuel cell system comprising
   fuel cell means including an electrically responsive regulating means,
   means for monitoring the voltage output of said fuel cell means,
   means responsive to said monitoring means for producing an electrical output pulse when the voltage output of said fuel cell means declines,
   bistable means capable of providing an electrical output the polarity of which is reversible by the electrical pulse, and
   summing network means responsive to the electrical output of said bistable means and the current value produced by said fuel cell means for providing an electrical control signal to said regulating means.

7. A fuel cell system according to claim 6 in which said regulating means constitutes a temperature control unit.

8. A fuel cell system comprising
   a fuel cell means including an electrically responsive regulating means,
   means for generating a reference voltage,
   means for comparing the reference voltage with the output voltage of said fuel cell means and generating a signal reflective of the difference between the voltages,
   means for sensing the current output of said fuel cell means and modifying the signal to reflect the quotient of the voltage difference and the current output, and
   means for providing a control signal to said regulating means reflective of a phase comparison of the modified signal and a reference signal.

9. A fuel cell system as defined by claim 8 in which said regulating means is a temperature control unit.

10. A fuel cell system comprising
    a fuel cell means including an electrically responsive regulating means,
    means for generating a reference voltage,
    means for comparing the reference voltage with the output voltage of said fuel cell means and generating a signal reflective of the difference between the voltages,
    means for sensing the current output of said fuel cell means and modifying the signal to reflect the quotient of the voltage difference and the current output,
    means responsive to said modified signal for producing an electrical output pulse when the efficiency of said fuel cell means decreases,
    bistable means capable of providing an electrical output the polarity of which is reversible by the electrical pulse, and
    summing network means responsive to the electrical output of said bistable means and the current output produced by said fuel cell means for providing an electrical control signal to said regulating means.

11. A fuel cell system according to claim 10 in which said regulating means constitutes a temperature control unit.

12. A fuel cell system comprising
    a fuel cell means including an electrically responsive regulating means,
    means for sensing the electrical output of said fuel cell means and producing an electrical signal reflective thereof,
    means for filtering the DC component of the signal, and
    means for providing a control signal to said regulating means reflective of a phase comparison of the filtered signal and a reference signal.

13. A fuel cell system as defined by claim 12 in which said electrically responsive regulating means is a temperature control unit.

References Cited

UNITED STATES PATENTS

| | | | |
|---|---|---|---|
| 3,160,528 | 12/1964 | Dengler et al. | 136—86 |
| 3,172,784 | 3/1965 | Blackmer | 136—86 |
| 3,253,957 | 5/1966 | Turner et al. | 136—86 |
| 3,268,364 | 8/1966 | Cade et al. | 136—86 |

WINSTON A. DOUGLAS, *Primary Examiner.*

H. FEELEY, *Assistant Examiner.*